June 2, 1942.   E. DE V. TOMPKINS   2,284,693
PORTABLE SAWING APPARATUS
Filed June 30, 1938   4 Sheets-Sheet 3
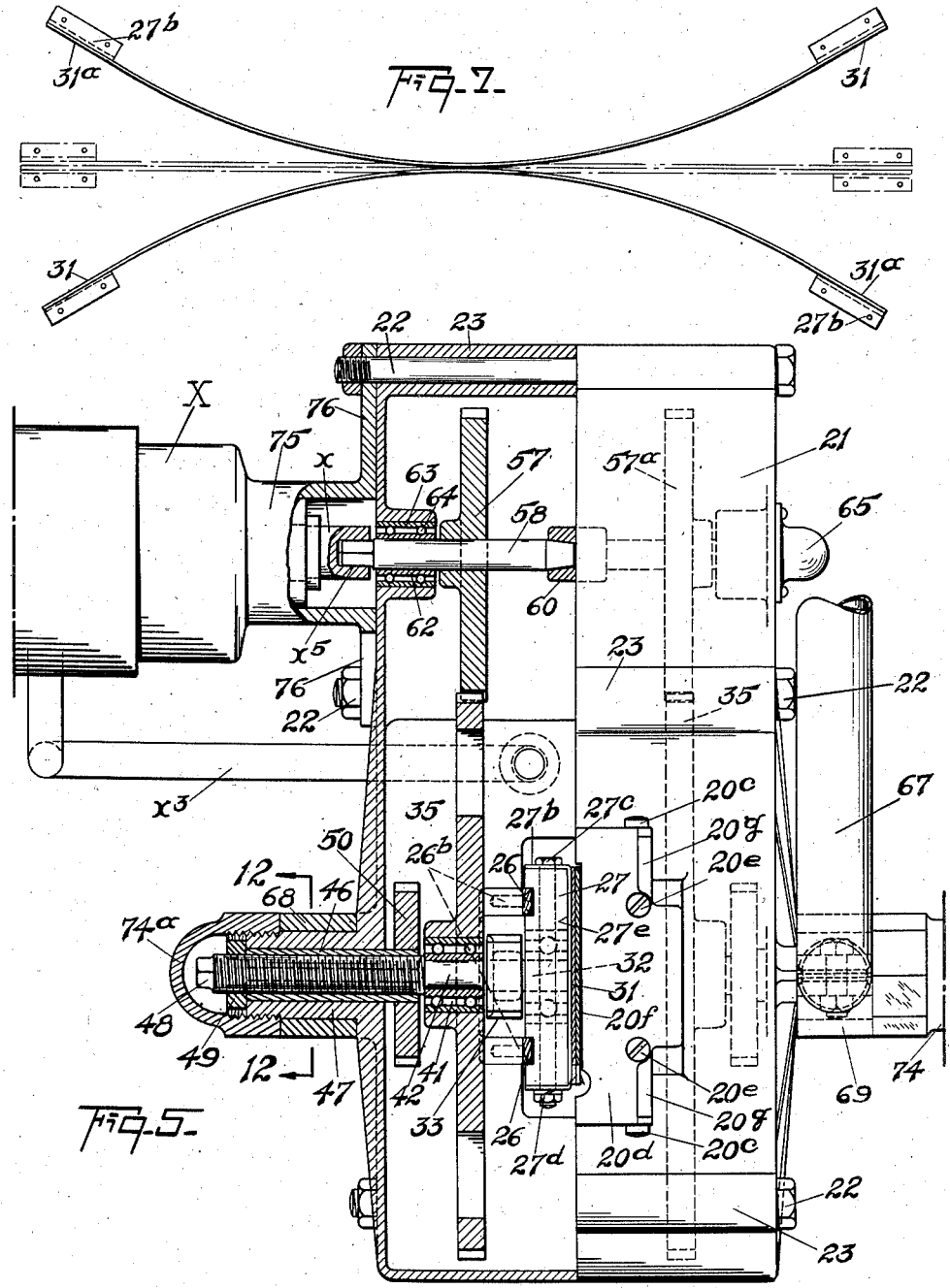

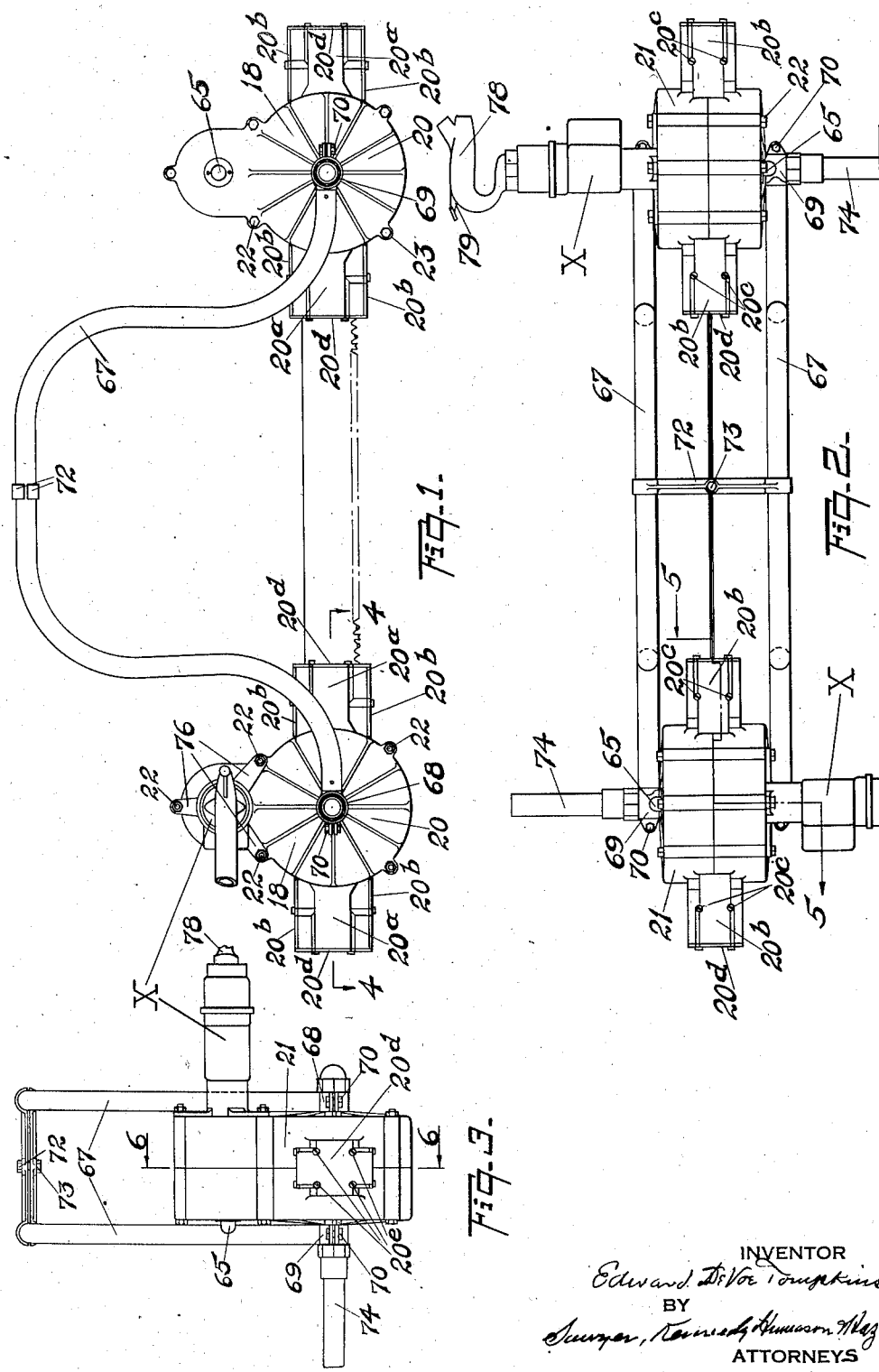

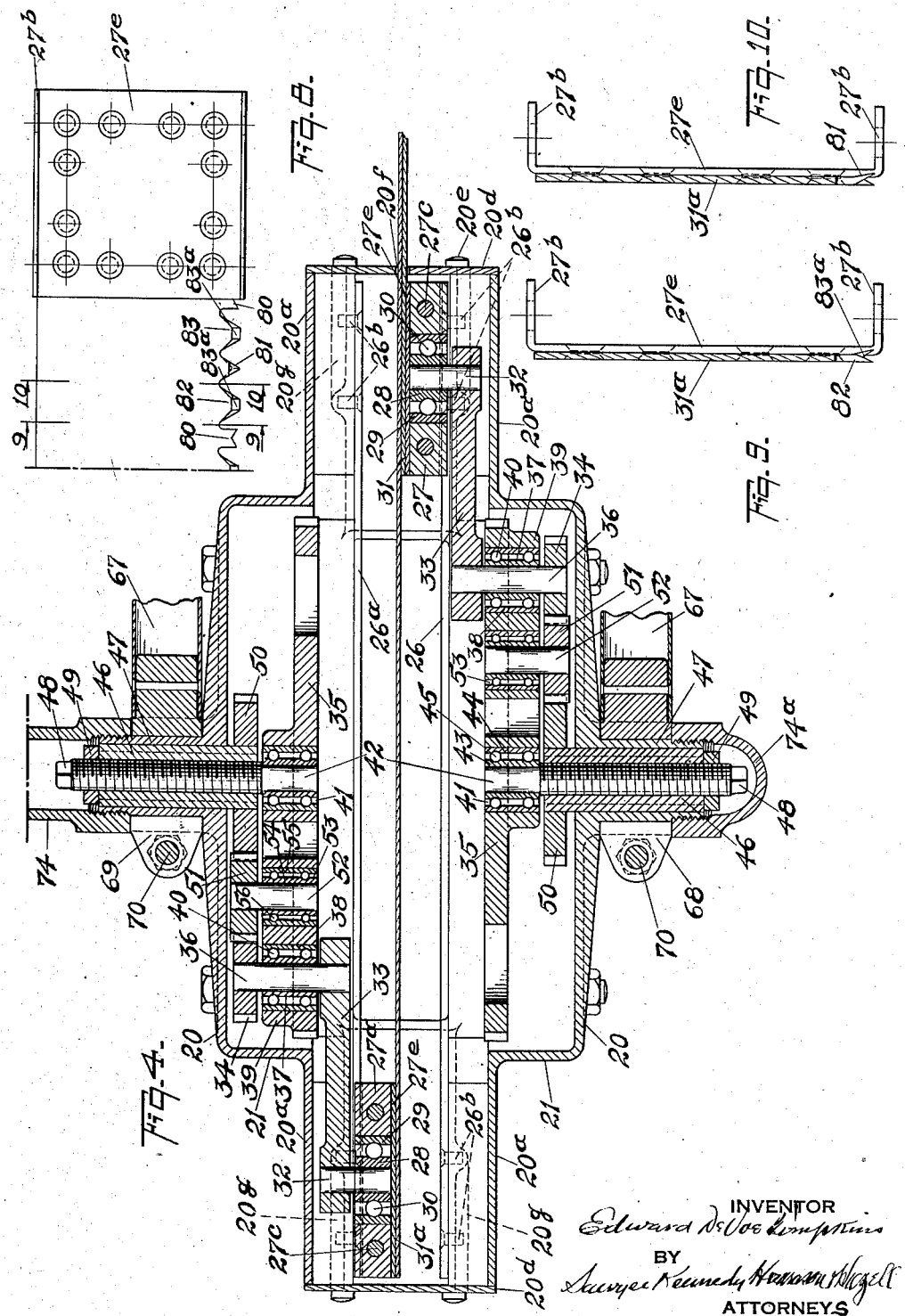

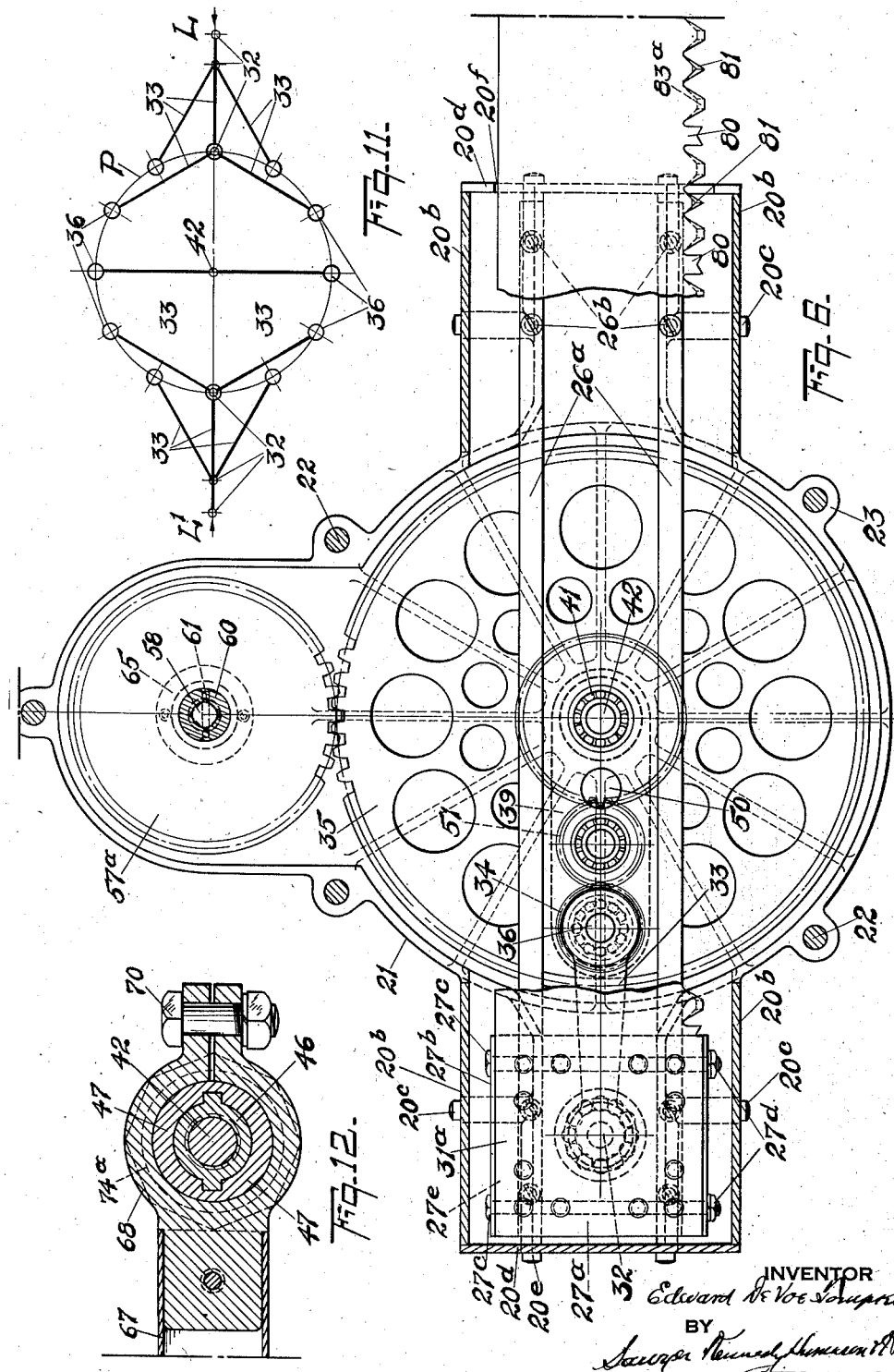

Patented June 2, 1942

2,284,693

UNITED STATES PATENT OFFICE 2,284,693

PORTABLE SAWING APPARATUS

Edward De Voe Tompkins, New York, N. Y.

Application June 30, 1938, Serial No. 216,649

10 Claims. (Cl. 143—68)

This invention relates to power-driven portable sawing apparatus, and particularly to the type of apparatus in which two identical saw-blades are reciprocated simultaneously in opposite directions, the blades being arranged in close contact side by side so as to cut a single kerf.

It is an important object of the invention to provide a compact and relatively light mechanism for driving each saw blade at a rate of movement which varies during each reciprocation from a maximum speed at about the central portion of the stroke, to a relatively slow speed at the beginning and end of each stroke. This prevents any injurious effects of momentum and avoids the shocks or jars which otherwise might occur in starting the saws into the timber, because the operators may arrange to make the initial contact of the saws with the timber to be cut at the moment when the saws are at or near the ends of their strokes, and therefore moving at their slowest speeds.

In such an apparatus it is important that the blades be driven at precisely synchronized speed so that each blade will move at all times at the same speed as the other blade but in the opposite direction. With this arrangement, and where the saws are identical in all respects and particularly in number and type of teeth, the opposed longitudinal drags or resistances of the blades will balance each other at all times, thereby producing steady, even operation. This is important since even with identical saws, slight variations of speed of the saws relative to each other will tend to develop not only a resultant endwise but also a lateral thrust on the entire apparatus which results in vibration, shifting of the apparatus, or of the work, and increased difficulty in manipulating the apparatus.

In a portable sawing apparatus of the type hereinbefore referred to it is extremely important that the weight be low enough to allow the apparatus to be handled readily and easily by two operators, because, as has been found, if the weight of the apparatus is such as to require considerable exertion by the operators in handling it, there will arise difficulties of operation as, for example, those due to too much pressure of the blades toward the timber and side stresses on the apparatus due to failure to maintain the blades in the vertical plane of the kerf.

With the above general object in view and some others which will be obvious to those skilled in the art from the description hereinafter, the invention comprises a power-driven portable sawing apparatus of the type hereinbefore referred to in which is embodied a pair of epicyclic gear-trains of such a type that the train itself will be of relatively small external diameter while at the same time the saw-blades will be given a working stroke of sufficient length for practical purposes. In such an apparatus the casing for the gearing can be made relatively small and, hence, may be made so light as to achieve fully the desired results. The gear-trains are arranged adjacent to each other in such a way that the respective ends of the saw-blades may reciprocate between them, each gear-train being operatively connected with its respective saw-blade through a crank-arm which remains within the boundaries of the epicyclic gear-train except near the end of the stroke so that a relatively small extension of the casing at two diameters will serve to enclose the exterior space required by the crank-arms when emerging from the boundaries of the gear-trains. The two gear-trains are connected by a common gearing whereby they are compelled to move in synchronism at all times.

In the most important embodiment of the invention, each end of each blade is connected to an epicyclic gear-train, so that two pairs of such trains are employed, each pair being connected by its own common gearing. By this arrangement compressive stresses acting longitudinally on the blades are entirely avoided.

The power for actuating the gear-trains to reciprocate the saws is furnished by a rotary motor and is directly applied to the common gearing which connects a pair of epicyclic gear-trains. In the best embodiment of the invention two such motors are employed, one at each end of the apparatus. While an electric motor may be used, a rotary compresed air motor has important advantages, because the exhaust from such a motor may be discharged through the casing enclosing the gearing. Since the blades enter the casing through an opening provided for that purpose and since this opening is not airtight, the air leaves the casing through the said opening and therefore in close contact with the saw-blades. As a result of this arrangement the expanded compressed air serves to cool the gearing and also the saw-blades. Furthermore, it keeps dirt and dust from entering the casing and blows the saw-dust away from the kerf. Also, as the motor is kept lubricated, the air discharged from the motor carries some oil in well-diffused condition and this deposits on the gearing and thereby serves to lubricate the latter in a most efficient manner.

In this type of duplex sawing apparatus it is important to maintain the saws in continuous flatwise contact with each other. For this purpose the saws may be longitudinally bowed before assembly and are normally maintained under lengthwise tension; and in the best embodiment of the invention shown herein, they are provided with a special tooth construction for the same purpose. This arrangement includes a series of teeth having side and bottom edges beveled on their outer faces to impart a wedging thrust toward the other saw; and although teeth having the opposite bevel are interposed, they are arranged so that their transverse thrust is substantially less, as by employing a smaller number thereof and by forming them with a point rather than a straight lower edge.

Further important features of the invention will appear in connection with the description of the best embodiment of the invention, illustrated in the accompanying drawings, in which Fig. 1 is a side elevation of an assembled apparatus with two drive units;

Fig. 2 is a top plan view thereof;

Fig. 3 is an end elevation thereof;

Fig. 4 is an enlarged horizontal section on line 4—4 of Fig. 1;

Fig. 5 is an enlarged vertical section on line 5—5 of Fig. 2;

Fig. 6 is a vertical central section, with parts broken away, the section being taken on the line 6—6, Fig. 3;

Fig. 7 is a diagrammatical plan view of a pair of saw-blades;

Fig. 8 is a detail view of an end portion of a saw showing the tooth structure and mounting plate;

Fig. 9 is a section through the saw on line 9—9 of Fig. 8 showing the inner tooth structure;

Fig. 10 is a section on line 10—10 of Fig. 8 showing the outer tooth structure;

Fig. 11 is a geometric diagram of the epicyclic gearing drive motion; and

Fig. 12 is a detail section through a casing hub.

The apparatus shown comprises two casings, each containing two sets of epicyclic gear-trains for converting rotary motion into reciprocatory motion, and two saw-blades having smooth backs in close contact with each other, each end of each blade extending into the respective casing, in which are two cross-heads, one for each blade, and guides for each cross-head. The epicyclic gear-train is specially constructed and arranged, as more fully described hereinafter. Furthermore, each casing contains a gearing which is common to the two sets of epicyclic gearing, this gearing including a shaft and gear wheels meshing with gears of the respective pair of epicyclic trains. At least one common gearing is arranged to be driven by the motor and in the best embodiment both common gearings are so driven each by its own motor. Suitable means for controlling the motor are provided convenient to the respective operators. The motor may be located at one side of the respective gear casings.

Each gear casing is of such shape as to envelop closely its respective epicyclic gearing and also the common gear therefor. When viewed from one side of the apparatus, the wall 20 of the casing, which may be called an end wall, appears generally circular with a generally semicircular portion above it, as will be clear from Fig. 1. The side walls 21, conform to the outline of the end walls. Each casing is formed in two parts joined along the middle and held together by suitable fastening means. In the construction illustrated, the fastening means consists of bolts and nuts, indicated at 22, Figs. 1 and 5, extending from one end of the casing to the other end and arranged to draw the two half-casings together, the casing wall being thickened at the points where the bolts are located, these thickened portions projecting on the outside of the casing, as indicated at 23, Fig. 5. The holes for the bolts are formed in the thickened wall portions, in any suitable way, as, for example, by coring them in the walls when casting the casings or by drilling them.

Each casing has openings diametrically opposite each other, arranged to permit travel of the saw-blades and cross-heads and to allow for the extension of the guides which are beyond the limits of the main casing body. With the type of epicyclic gear-trains employed herein the main portion of such gearing may be enclosed in a relatively small casing body provided with suitable extensions hereinafter described for enclosing the path of the blades and cross-heads beyond such body portion, thereby greatly reducing the weight of the apparatus.

The cross-head guides may be made of flat bars, 26, 26a, of suitable metal, most advantageously of rolled steel, there being four of these bars, each of which is suitably secured to the casing, as by machine screws, most advantageously two at each end, as indicated at 26b, Fig. 4.

The cross-head guides in each casing serve as the runways for two cross-heads, which are indicated at 27, 27a, Figs. 4 and 5. Each cross-head has two channels or grooves to receive its respective pair of bars on which it slides, the cross-head 27 being guided by the bars 26, and the companion cross-head 27a being guided by the bars 26a. Each cross-head also has a bearing to receive a wrist-pin, more fully described hereinafter. While various forms of bearings may be employed, the best embodiment of the invention comprises a suitable antifriction bearing such as the ball-bearing shown in Fig. 4, consisting of an inner bearing ring 28, having an exterior circumferential ball groove or channel, an outer bearing ring 29 having its inner surface provided with a groove or channel for the balls, and a plurality of balls 30 which are placed between the two bearing rings. The outer bearing ring 29 is fitted tightly into an opening formed in the respective cross-head, where it may be secured in any suitable way. It will be noted that the ball-bearing shown and described is of the general type which will resist thrust as well as radial stresses.

As there are two casings, held apart in any way and each casing has two cross-heads, there are four cross-heads to be attached to the two ends of the two saws, one cross-head for each end of each saw. Each end of each saw 31, 31a, is arranged to lie flat against the inner face of its respective cross-head 27, 27a, so that the inner faces of the two saws press against each other and thereby react to press each cross-head toward its respective guide bars. To avoid the excessive friction which would thereby result, each cross-head at its notch to receive the respective guide-bar is provided with a clearance space, as shown in Fig. 5. Each end of each saw is secured to its respective cross-head in any suitable manner. One convenient way of accomplishing this result is to provide each end of the saw with two flanges, 27b on mounting plate 27e mounted as by flush riveting on the end of the saw-blade. Flanges 27b engage the top and bottom faces, respectively, of the corresponding cross-head and are held by bolts 27c, extending through the respective cross-head and through both flanges, each bolt having a nut 27d, as shown in Fig. 5. The nuts may be locked by spring lock-washers, such as indicated in Figs. 5 and 6.

The cross-heads reciprocate in their respective guides across the interior of the respective casings, and in the construction shown each cross-head at the limit of its stroke in each direction travels a substantial distance beyond the cylindrical portion of the casing, due to the special type of drive arrangement hereinafter set forth. The casing is provided with a suitable extension at each side enclosing the cross-heads at their limits of travel and preferably provided with suitable openings or detachable plates to facilitate access to the cross-heads. In the arrangement illustrated, each runway extension box comprises side walls 20a which may be made integral with the main cylindrical portion 18 of the casing; top and bottom walls 20b which may be removably mounted on side walls 20a by screws 20c and an end plate 20d removably mounted on side walls 20a by screws 20e. Plate 20d covering the outer extension box may be formed in a single piece; but the corresponding plate on the inner extension box is formed in two sections recessed at their abutting edges to provide a suitable slot 20f (Figs. 5 and 6) forming a passageway for the saw-blades and an outlet for the compressed air from the motor. The side walls 20a may have a projecting central area and an inwardly offset upper and lower portion connected to the central area to form a trough construction which may be provided with suitable enlarged portions 20g positioned to received screws 20c, 20e and 26b (Figs. 4 and 6), for mounting the guide bars 26, 26a, the enlargements 26g serving likewise to reinforce the side walls 20a of the runway extension box. Each cross-head is engaged by a wrist-pin 32, Fig. 4, cylindrical in cross-section and fitting properly into the central opening of the respective inner bearing ring 28. Each wrist-pin 32 is fixed in one end of a crank 33 fixed to a stub-shaft or pin 36 journaled in a bearing carried by a gear-wheel 35. To the end of the stub-shaft 36, outside the gear-wheel 35 is fixed a planet-wheel 34, as shown in Figs. 4 and 6. The wrist-pin 32 is so located that the longitudinal axis will be at right angles to a plane of rotation of the planet-wheel 34, as will be clear from the foregoing explanation. The planet-wheel 34 is revolubly mounted on and carried around by the gear-wheel 35 which may be designated as the sun-wheel. The bearing for the stub-shaft 36 is most advantageously a ball-bearing, indicated diagrammatically in Fig. 4. It comprises a sleeve 37, an outer bearing sleeve 38 secured in a hub 39 carried by the sun-wheel 35. The bearing sleeves 37 and 38 have raceways for a set of suitable anti-friction devices such as the balls 40.

In the preferred arrangement illustrated herein, crank 33 is fixed to the inner end of shaft 36 and planet-wheel 34 to the outer end thereof at opposite sides of the bearing 37. The sun-wheel 35 is revolubly mounted in the casing in any suitable way. In the embodiment illustrated in the drawings the sun-wheel is mounted through ball-bearing 41 on stub-shaft 42 carried by the casing, the ball-bearing 41 comprising an inner race 43 fixed to shaft 42, an outer race 44 fixed to the sun-wheel 35, and balls 45 between races 43 and 44. The ball-bearing 41 is preferably of the type suitable for resisting both radial and axial thrusts.

Shaft 42 is preferably mounted in the casing by means permitting axial adjustment of the shaft and the parts carried thereby. In the preferred form illustrated this is accomplished by threading-shaft 42 into a splined sleeve 46 fixed in hub 47 carried by the casing, the shaft being provided with means for facilitating adjusting rotation thereof, such as the polygonal tip 48, and is held in adjusted position by lock-nut 49.

Planet-wheel 34 is rotated about its axis through an intermediate direction-reversing gear, 51, from a fixed gear 50 mounted coaxially with sun-wheel 35. While various methods of arranging and mounting these wheels and gears may be utilized, in the preferred form illustrated in Figs. 4 and 6 the fixed gear 50 is mounted on the splinder sleeve 46, between the casing and ball-bearing 41, and meshes with the change gear 51, which in turn meshes with the planet-wheel 34. Gear 51 is suitably mounted on sun-wheel 35, the form illustrated employing a stub-shaft 52 fixed to gear 51 and rotatably mounted on sun-wheel 35 through ball-bearing 53 composed of an inner raceway 54 fixed to shaft 52, an outer raceway 55 fixed to sun-wheel 35 and cooperating balls 56, the bearing 53 being arranged to resist radial thrust.

A convenient and strong construction for mounting shafts 36, 42 and 52 on sun-wheel 35 is likewise illustrated, and comprises a transversely enlarged portion of sun-wheel 35 forming a composite hub for said shafts which are positioned in alignment in the hub.

The gearing thus far described, comprising the sun-wheel 35, the planet-wheel 34, change gear 51 and fixed gear 50, together with their connections and mountings, constitute an epicyclic gear, and the elements are so dimensioned that the pitch diameter of the planet-wheel 34 is one-half the pitch diameter of the fixed gear 50 so that when the sun-wheel 35 is revolved by the driving gear as hereinafter explained, the axis of rotation of the planet-wheel will move orbitally and at the same time the planet-wheel will be revolved about its axis because of its engagement with fixed gear 50 through change gear 51. The radial distance between the axes of pin 32 and shaft 36 is equal to the radial distance between the axis of shaft 36 and the axis of shaft 42. With this arrangement the axis of the wrist-pin 32 will be reciprocated in a straight line passing through the projection of the axis of shaft 42, which is arranged symmetrically between the guide bars 26, so that the respective cross-head 27 is reciprocated in its guides. This movement is diagrammatically illustrated in Fig. 11 in which the pivot 36 of the planet-gear 34 travels in the circular path P and since the planet wheel 34 is rotated in a direction opposite so that in which pin 36 travels along path P and at twice the angular rate, the wrist-pin 32 will be impelled along the path, L, L¹ in a straight line passing through an extension of the axis of the central shaft 42.

The casing contains two epicyclic trains of gearing of the kind described, each having its wrist-pin arranged to drive its corresponding cross-head. The arrangement of the parts is such that when one cross-head is at one end of its stroke, the companion cross-head is at the opposite end of the stroke. This is shown, for example, in Fig. 4 where the cross-head 27 is at the extreme end of its stroke to the right, in Fig. 4, while the cross-head 27a, is at the extreme end of its stroke to the left in said figure. Thus the planet-wheels are at all times on opposite sides of the axial line through the axes of rotation of the respective sun-wheels, and, since the sun-wheels are tied to each other by a common gearing, the various stresses brought about by the operation of the duplex epicyclic gear-trains are at all times balanced, and, therefore, there is no unbalanced external force to move the casing in any direction.

An important feature of the invention is the means for rotating the two sun-wheels in unison. The best embodiment of the invention will be described in connection with Fig. 5, in which half of the gearing and drive construction is shown in central section, and some gear wheels of the other half are indicated in dotted lines. In such embodiment the driving gearing comprises two gear-wheels, one, 57, being shown in full lines and the other 57a, in dotted lines, in Fig. 5. The gear wheel 57 meshes with one of the sun-wheels 35, while the gear wheel 57a meshes with the other sun-wheel, 35, indicated in Fig. 5 in dotted lines.

Each driving gear wheel 57, 57a, is fixed on its respective half of a two-part driving shaft 58 having its two parts arranged to be coupled by a suitable coupling device which will permit the ready separation and replacement of the two parts of the driving shaft, when the halves of the casing are taken apart or put together.

One satisfactory form of coupling for the purposes of this invention has the meeting ends of the parts of the drive shaft tapered and formed polygonal in cross-section, for example, square, as shown in Fig. 5, and these ends fit snugly into opposite ends of a socket coupling member 60, which may be secured to one shaft part in any suitable way, as by a pin 61 passing transversely through the coupling member and shaft part, the ends of the pin 61 being riveted if desired. See Fig. 6.

The driving shaft is suitably journaled in the casing and may be mounted in antifriction bearings. As shown, each bearing has an inner bearing sleeve 62, an outer bearing sleeve 63 and suitable antifriction devices such as balls 64, held in ball-races or grooves formed in the bearing sleeves.

Each end of the drive shaft projects outside the casing and is made polygonal in cross-section, for example, square, as shown in Fig. 5. Any suitable compact rotary motor may be employed to rotate the gearing drive shaft. In the particular embodiment illustrated a rotary motor to be driven by compressed air is illustrated, somewhat diagrammatically, in Fig. 5. This motor, indicated generally at X has a motor shaft x driven by a suitable rotor fixed thereon in known manner, air motors of this type being generally employed for driving power tools. The motor exhaust is discharged into the casing through exhaust pipe x3 or in any other suitable manner. The end of the shaft is provided with a socket device x5 arranged to fit on either polygonal end of the gearing drive shaft 58, that end which is not engaged by the motor being covered by a readily removable cap 65, Fig. 5, which may be held to the respective wall of the casing in any suitable manner. By removal of the cap, a socket wrench may be applied to the projecting squared end of the drive shaft 58 in order to turn the gearing by hand when necessary, as, for example, when attaching or detaching a saw blade to its cross-head.

As hereinbefore described, there are two casings, each with its contained epicyclic gearing of the type already described. These casings may be held apart in any suitable way, even manually by the two operators, each of whom may grasp the two handles, 74 and 78 of the casing at his end and pull to tension the saw-blades, as for example when felling trees. However, in the complete embodiment of the invention, means are provided for straining or tensioning the blades a predetermined amount. One such means, illustrated in Figs. 1 and 2, comprises two yoke-devices 67, arranged to be secured to the hubs, 47, of the respective casings. As shown, each yoke-device is of tubular metal and has its ends connected to split annuli 68, 69, fitting over the respective hubs, 47, of the casings.

Suitable means are provided for tightening the split annuli 68 and 69, such as the bolts and nuts indicated at 70, Fig. 1.

In this embodiment of the invention, the yokes 67 are connected by a cross-brace 72 which is put in place after the yokes have been attached to the hubs of the respective casings. This cross-brace consists of two parts, held together by a bolt 73 provided with a nut, as will be clear from Fig. 3. Each part has a nearly semicircular jaw at each end and when the nut is tightened on the bolt 73 the respective pairs of jaws clamp firmly the respective yoke-devices. The hubs 47 on the casing project beyond the split annuli 68, 69, and are threaded to receive at one side of the drive unit a tubular handle 74 on one hub 47 and a cap 74a threaded on the opposite hub 47, the handle 74 and cap 74a serving to retain the split annuli 68, 69, in position on hubs 47.

In one embodiment of the invention, each rotary motor is a one horse power vane type of air motor, normally operating at about 350 revolutions per minute with an air pressure of about 70 pounds per square inch. Motors of this kind have a stalling torque of about 30 foot-pounds. As such motors are known and commercially obtainable, no specific description of the details of construction of such motor is given. However, the casing of such a motor is modified somewhat to provide it with means by which it may be attached in a convenient and readily removable manner to the respective casing of the sawing apparatus. As shown in Fig. 1, the motor casing 75 has a plurality of arms 76, in this case three, each provided with a hole at its end, so that by removing the nuts from three of the upper bolts 22, which aid in holding the two halves of the casing together, the arms may be put on said bolts and the nuts replaced and screwed tight, thereby securing the rotary motor firmly to the said casing, in which condition the socket X5, at the end of the motor shaft, engages the corresponding end of the driving shaft 58 of the sawing apparatus.

The motor casing is provided with a suitable handle 78 which is advantageously curved, as shown in Fig. 2, and is intended to be connected to the air-hose leading to a suitable source of compressed air, not shown. In the handle 78 there is the usual control valve, not shown, which is operated by a lever extending outside the handle, as indicated at 79, convenient to the operator's hand.

In practice, the sawing apparatus requires two operators, one for each end of the apparatus. The motors are connected to the respective casings on opposite sides of the apparatus, so as to have the handle 78 of each motor in the proper position to be grasped by the right hand of the respective operator, the left hand of the operator grasping the tubular handle 74, which is on the opposite side of the respective casing.

The saw blades employed as elements of the new sawing apparatus are of special construction, in that each is given a predetermined curvature longitudinally, as indicated in Fig. 7, so that when the blades are put in close contact with each other, back to back, as indicated in dotted lines in Fig. 7, and the respective ends of the blades secured to the corresponding crossheads, there is a sufficiently strong lateral pressure of each blade against the other, whereby they are maintained in close contact with each other in one saw-kerf during the sawing operation, and hence, cannot be spread apart or separated to saw separate kerfs, by any variations in hardness of the timber which is being sawed. The backs of the blades should be well polished.

In an apparatus of the type described, it is advantageous, in order to avoid any tendency of the blades to separate, and, in fact, to increase the tendency to stay in close contact and at the same time to give a rapid cutting action, to have the saw-teeth of the blades shaped in a particular way, as will now be described.

Each blade has a series of groups of teeth, each group comprising two unset cutting teeth, a set cutting tooth and a planer tooth, or clearing tooth. All the unset cutting teeth have their ends or points in a straight line, and all the planer or clearing teeth have their ends in a line, but this line does not register with the line of the unset cutting teeth, because the planer teeth are shorter than the unset cutting teeth. All the set cutting teeth are set in one direction, only, that is, away from the back of the saw-blade. These teeth before setting, were of the same length as the unset cutting teeth, but after setting have their ends in a line which is outward from the vertical plane of the outer face of the unset cutting teeth and slightly above the level of the line of the ends of the latter.

The unset cutting teeth are beveled on the outer faces in both directions so as to provide a sharp cutting edge in each direction of movement of the saw-blades, the bevel serving also as a wedge, so that as the blade is moved longitudinally, the wedge action of the unset cutting teeth of each saw-blade, while it is sawing, will tend to crowd such saw-blade toward its companion saw-blade, the wedge of the unset cutting teeth of one saw-blade acting in opposition to that of the unset cutting teeth of the companion blade. The set cutting teeth are also beveled to provide sharp cutting edges in both directions of movement of the saw-blade, but in this case the bevels are on the inside of the respective set teeth and would tend, by their wedge action, to crowd the saw-blade away from its companion blade. However, this disadvantage is overcome by the wedge action of the greater number of beveled outer faces of the unset teeth. The wedging action of the unset teeth may be accentuated by forming these teeth with straight lower edges which are appropriately beveled on their outer faces to provide chisel ends to said teeth.

Figs. 8 and 9 illustrate the construction referred to where each group comprises four teeth, one being the planer tooth 80, the remaining three teeth being cutting teeth, one of which, 81, is set outward while the cutting teeth at each side of it are unset, that is straight, as indicated at 82 and 83. Each of the teeth 82 and 83 is beveled on the outer face, while the tooth 81, of each group is beveled on the inside face. The bevel chisel edges of teeth 82 and 83 are indicated at 83a.

The particular embodiment of the invention hereinbefore described is particularly suitable for cutting off piles or sawing heavy timbers, as, for example, in building or repairing docks and piers, though, of course, it finds application in other engineering work where compressed air is generally available for operating rivetting, drilling or wood-boring machines such as are commonly known. The new apparatus, constituting the invention, takes advantage of the presence of air-compressing apparatus by providing a compact power-operated sawing apparatus, replacing the usual two-man cross-cut saw and light enough to be handled readily by two men, while, at the same time, giving a rapidity of operation which will materially reduce the labor cost. It may be constructed so as to saw rapidly timbers as large as 20 inches square while, at the same time by the use of modern light and strong metals or alloys, the weight of such apparatus need not exceed 50 pounds, which compares favorably with the weight of other manually handled power-operated tools now in use, for example, wood boring tools operated by compressed air and intended to be handled by one man, such a tool weighing 45 pounds.

It will be observed that with the sawing apparatus of my invention, the only external reaction or stress, not counterbalanced within the apparatus itself, is the lateral stress due to the reaction of the two saws running in opposite directions, which tends to swing the respective casings of the apparatus sidewise first in one direction and then in the other. However, since the two saw blades run in close contact so that their two kerfs merge into one, and since the lever arm of the stress is merely the thickness of the blade, this tendency to cause a lateral swing is readily counterbalanced by a slight resistance on the part of each man who has a relatively long leverage for the resistance to lateral movement because of the widely separated handles, which he grasps.

Thus the lateral stress is of little practical importance and may be disregarded. Aside from this lateral stress there are no external reactions, if the apparatus is accurately built, because there are four identical sets of epicyclic gearings, two sets of two gearings in each casing, the two in a casing having the planet-wheels set with their respective axes of revolution diametrically opposite each other, as hereinbefore explained.

Furthermore, as there are two saw blades which are reciprocated in opposite directions, there is no tendency of the sawing apparatus to move in the direction of the length of the saws, because the longitudinal reaction of one blade, as it saws a beam or the like, is always opposite in direction to the reaction of its companion blade. Thus, there is no necessity for clamping the material to be sawed, for any tendency of one blade to move such material is overcome by the tendency of the coacting blade to move the material in the opposite direction, these two reactions of the two blades always being equal and opposite. Of course, it is assumed that each of the two blades cuts in both directions of movement, and that both blades cut equally in each direction. In practice such a result may be attained because the teeth of each blade are arranged to cut in both directions and are identical with those of the companion blade.

By making the teeth of the blades as hereinbefore pointed out, with the points of the cutting teeth extending slightly below the line of the points of the planer or plow teeth, and with the teeth similar in the two blades, the substantially equal but opposite longitudinal reactions of the two blades while sawing, are assured. It will be understood, that the size of the teeth may be as required for the work to be done, or the material to be sawed.

In order to obtain the desired predetermined tension on the blades after they have been connected with their respective cross-heads, the yoke-devices are each subjected to a predetermined compressive stress in the direction of moving the ends of the yoke-device toward each other, the compressive stress being within the elastic limit for the yoke-device. The compressive force may be applied in any suitable way, as by a screw-clamp or even with a so-called Dutch windlass, that is, a double cord or rope twisted by a bar inserted between the strands, or by a turn-buckle draw clamp. While in the compressed condition the ends of the yoke-devices are attached and firmly secured to the casings, after which the yoke-devices are freed from the compressive stresses to which they have been subjected, and thereby the reactions of the yoke-devices are thrown upon the casings in the direction of separating them and thus tension the saw-blades to the extent of the force due to the sum of the reactions of the two yoke-devices, which, of course, may be predetermined by the amount of compressive stress applied to the yoke-devices before putting them in place. The elastic reactions of the yoke-devices when in place are such as to exert a pull or tension on the saw-blades, that is, within the elastic limits of the blades. The yoke-devices, or other mechanical devices, will prevent the casings from being moved toward each other, except to the slight extent due to the elasticity of the yoke-devices, or other straining device, and the saw-blades prevent the casings from being moved away from each other. Thus the saw-blades and the straining device coact to maintain the casings at substantially a predetermined distance apart. The connections between the yoke-devices and the hubs of the casings are such as to allow for the slight variations in angle of the ends of the yoke-devices, due to the slight spring of the latter.

The method of removing and replacing saw-blades is as follows:

The tension on the blades is relieved by applying a compressive force to the yoke-devices in the manner hereinbefore explained. Then the cover-cap 65 at the end of the drive-shaft of one casing is removed and a hand crank applied to the squared end of said shaft and actuated to move the cross-heads to the respectively opposite ends of their strokes. Due to the form of epicyclic gearing employed, the crank-arms 33 may be moved to a position where they will project substantially beyond the main body of the casing; and by removing the cover-plates 20d the cross-heads at each end are fully exposed at their upper and lower faces and the bolts connecting the saw-blades to the cross-heads may be removed with convenience and speed. In this way the saw-blades may be conveniently removed for sharpening and replacement or to introduce new blades. The method of replacing the blades is obvious from the above explanation.

It is to be observed that in the apparatus shown in Figs. 1 and 2 there can be no buckling of a blade due to the pushing action of one cross-head, because even if only one motor were operating, such motor when tending to cause a pushing action on one blade, is causing a pull on the other blade, and because of the tension due to the pull on the latter blade, the gearing at the end opposite the working motor is driven in synchronism with the directly driven gearing and thereby develops a pull on the blade which is being pushed by the active motor. Because of this action it is not necessary to provide a very heavy fixed tension on the saw-blades by straining them with the yoke-device.

It is also to be noted that the two sets of epicyclic gearing in one casing run in unison with the two sets of identical gearing in the other casing, because the saw-blades form a fixed connection between the four sets of gearing. As each motor drives not only its own two sets of gearing but also the other two sets in the casing opposite, because of the connection through the saw-blades, which may be said to be alternately pulled and pushed by such motor, no difficulty can arise from starting one motor after another, as would naturally occur when one operator opens his motor air-valve after the other operator has started his own motor.

In a well constructed apparatus embodying the invention in its best form, there is no vibration other than the trivial tendency to lateral swinging of the casings due to the fact that the two saw-blades do not run exactly in the same path, as has been previously explained. This tendency is easily counteracted without undue effort of the operators in holding their respective pairs of handles.

By the particular combination of elements hereinbefore shown and described, a remarkable compactness is obtained. For example, the apparatus may be designed to cut timber measuring 18 inches along the kerf, and yet be within an out-to-out size of 51 inches, which is much sorter than the present two-man cross-cut hand-saw, used for cutting timber of the size mentioned above.

Although it is not necessary to have the stroke of the blades equal to the maximum size of timber to be sawed, it probably is true that the efficiency is improved if the stroke is increased as the size of timber to be cut is increased. In the apparatus illustrated in the drawing, a timber 18 inches across may be readily cut even though the stroke of the saw blades is only 12 inches.

While, as hereinbefore described, any suitable rotary motor may be employed, there are several important advantages in the use of a compressed air-motor, because its exhaust may be used in part to blow the saw dust from the kerf and by its expansion to cool the blades. It preferably will be allowed to enter the casing, thus causing a draft of air outward from the casing, to prevent dust and dirt entering the casing. This air in expanding will have a cooling effect, and serves to assist in distributing lubricant to all parts of the gearing, because oil supplied to the compressed air motor, as is usual in practice, is gradually carried off as a fine mist in the exhaust and that portion which enters the casing condenses inside the same, thus reaching the various parts of the gearing and lubricating it sufficiently.

As hereinbefore described, the sun-wheels may be adjusted in or out toward the central plane of the casing, and locked in any adjusted position. Owing to the construction shown, this adjustability of the sun-wheels toward and from each other makes it possible to bring the backs of the saw-blades accurately in the central vertical plane and even to determine the proper degree of pressure between said saw-blades.

By means of the guides for the cross-heads the reaction due to the vertical pressure exerted to feed the saw downward while cutting, is transmitted directly to the casing through the guides, thereby keeping such reactions off the gearings.

In some classes of work, one casing, with its contained gearing and its motor, may be omitted, in which case the single motor and the single casing with its contained duplex epicyclic gearing, balanced as hereinbefore described, will be satisfactory, if not too heavy a resistance is encountered by the saws. In this way the weight of the apparatus is materially reduced. Such a light weight apparatus will naturally use shorter saw-blades; will not require the double yoke-devices and will not employ the curved blades. It will appear like Fig. 1 with the saw-blades cut off just to the left of the inner end of the right hand casing and with the double yoke-device and its connectors detached, all the remaining parts being the same as already described.

In this arrangement, however, the motor alternately pushes and pulls each saw-blade and there is no means for maintaining a predetermined tension on the blades, as in the completed embodiment of the invention. However, for lighter classes of work, replacing the ordinary one-man hand-saw, the simpler construction will be found satisfactory, this being due to the balancing of the two epicyclic gears hereinbefore described.

One important feature of the present invention is the self-alignment of the saws and the casings with their containing mechanisms due to the fact that the straining mechanism, either for cross-cutting or for ripping, exerts its reaction uniformly on both hubs of each casing.

The particular type of epicyclic gearing employed in this construction is highly important in apparatus of the type described. Since the entire gear-train is carried by a central support it is unnecessary to machine the interior of the casing to receive cooperating elements; and the parts may be readily and accurately assembled. Moreover, the employment of a central fixed gear with a planet-wheel revolving around the fixed gear, permits the design of a very compact gear-train structure whose radial dimensions need be only slightly more than a quarter of the full saw-stroke. This permits substantial lightening of the drive unit without sacrificing power. Moreover, the structure allows the arms 33 to be projected substantially beyond the gear-train, permitting added convenience in providing a compact casing structure at this point, including removable portions giving easy and full access to the saw-blade connections beyond the body of the casing and the gear-trains, for removal and replacement of the blades. Also the wrist-pin and its crank, which constitutes a drive connection for the saw-blade, is accessible for inspection.

The saw tooth construction shown in Figs. 8-10 has been found to be especially advantageous in eliminating the tendency of the saw-blades to separate at their cutting edges, one of the serious difficulties with prior saws of this type. The longitudinally extended chisel edge 83a travels in a groove cut by the beveled forward edge of the tooth and utilizes the downward pressure on the saw-blade to wedge the tooth strongly toward the other blade by pressure of the wood against the beveled outer face extending upwardly from said edge 83a. This arrangement holds the saws together by strong pressure at the very point where the tendency to separate the saws originates; and due to the equal rate of travel of both saws in opposite directions, a correspondingly balanced transverse thrust on the blade edges is obtained. The tooth construction and arrangement is likewise efficient and especially suitable for use in double blade power saws such as that described herein.

What is claimed is:

1. A portable sawing apparatus comprising two associated saw blades arranged with their backs in contact to form a sawing unit and means for supporting and driving the blades, including drive connections engaging contiguous end portions of the saw blades, means including two sets of interconnected epicyclic gear trains for imparting to the drive connections simultaneous rectilinear reciprocating movement in opposite directions at equal speeds between limits located beyond the gear train in the direction of said reciprocation, and a casing including a body portion enclosing the gear train and extensions at opposite sides surrounding the path of the saw-blade end portions and drive connections, provided with an aperture arranged for access to the drive connections.

2. A portable sawing apparatus comprising two associated saw blades arranged with their backs in contact to form a sawing unit, and an enclosed power-driven unit for supporting and driving the blades including a drive connection with an end portion of each saw blade, means including duplicate epicyclic gear trains each actuating a drive connection for imparting to the blades simultaneous rectilinear reciprocating movement in opposite directions at equal speeds between limits located beyond the gear train in the direction of said reciprocation, a casing having a body portion formed in separable sections each enclosing one of said gear trains, a common gear carried by the casing and arranged to maintain said epicyclic gear trains in synchronism, and casing extensions at opposite sides enclosing the path of the drive connections and associated saw-blade end portions.

3. A portable sawing apparatus comprising two associated saw blades arranged with their backs in contact to form a sawing unit and means for supporting and driving the blades, including duplicate opposed epicyclic gear trains each actuating a saw blade and each comprising a fixed central gear, a change gear and a planet gear meshing in sequence, an extension arm on the planet gear, and a pivoted connection between the arm and a saw blade end; and means for driving the gear trains in synchronism.

4. A portable sawing apparatus comprising two associated saw-blades arranged with their backs in contact to form a sawing unit and a power-driven unit for driving the blades, including a casing enclosing contiguous blade-ends and means in the casing for imparting simultaneous rectilinear reciprocating movement to the blades in opposite directions at equal speeds, including two epicyclic gear trains, each comprising a fixed gear mounted on the casing, a coaxial rotating drive-member, a planetary gear pivotally mounted on the drive-member, a change gear pivotally mounted on the drive-member and meshing with the fixed gear and the planetary gear, an arm fixed to the planetary gear and extending radially beyond its periphery, a connection on the arm beyond said periphery, engaging an end portion of its respective saw-blade; and means carried by the casing for synchronously rotating both drive-members, with the planetary gears and arms arranged in symmetrical opposite position.

5. A portable sawing apparatus comprising two associated saw-blades arranged with their backs in contact to form a sawing unit and means for supporting the unit and imparting to the blades simultaneous rectilinear reciprocating movement in opposite directions at equal speeds, including a pair of epicyclic gear trains each associated with an end of a saw-blade, each train comprising a fixed gear, a change gear and a planetary gear meshing in series, the pitch diameter of the planetary gear being half the pitch diameter of the fixed gear, an arm mounted on the planetary gear and arranged to extend beyond its periphery, a cross-head mounted on the end portion of the adjacent saw-blade, guide means for the cross-head, a pivotal connection between the arm and the cross-head, arranged to pass beyond the periphery of the planetary gear, the distance between the axis of the pivotal connection and the axis of the planetary gear being equal to the distance between the planetary gear axis and the fixed gear axis; means rotatable about the axis of the fixed gear for rotatably supporting the change gear and the planetary gear, and means for revolving the supporting means about the axis of the fixed gear, the fixed gears for the two gear trains being coaxial and the rotating means being synchronously driven from a common member and arranged with the planetary gears and arms in homologous positions at opposite sides of the fixed gear axis.

6. A portable sawing apparatus comprising two associated saw-blades arranged with their backs in contact to form a sawing unit and a power-driven unit for driving the blades including a casing formed with separable sections, a central support in each section, a pair of epicyclic gear trains, each carried entirely by its respectice support and connected to the corresponding saw-blade, and means for driving said gear trains in synchronism.

7. In a portable sawing apparatus, the combination, with a pair of identical saw-blades arranged in close contact with each other to work in a common kerf, and a pair of epicyclic gear-trains arranged contiguous to each other with a space between them, each train comprising a rotatable sun-gear wheel, a fixed gear wheel concentric with the sun-gear wheel, a planet-gear wheel and a change gear wheel, each journaled separately in the sun gear wheel, said change gear wheel meshing both with the fixed gear wheel and with the planet gear wheel, of a common gear device comprising a shaft and two gear wheels fixed thereon, each of said gear wheels meshing with its respective sun gear wheel, whereby the two epicyclic gear-trains are maintained in unison, cross-head guides located in the space between the gear-trains, said guides extending parallel to the diameters of the respective sun gear wheels and materially beyond the peripheries thereof, cross-heads movable in the respective guides, each cross-head being connected to one end of its respective saw-blade, cranks each actuated by its respective planet gear wheel, each crank being provided with a pivotal connection to its respective cross-head, each crank being arranged to swing beyond the periphery of the respective sun gear wheel and planet gear wheel during a part of its travel, and a casing closely enveloping the epicyclic gear-trains and their common gear device, said casing being provided with openings through which said cross-head guides extend beyond the boundaries of the epicyclic gear-trains, said casing also having extensions enclosing the extended portions of the guides, and the paths of travel of the cross-heads and of the cranks when they are outside the boundaries of the respective epicyclic gear-trains.

8. In a portable sawing apparatus, in combination, two identical reciprocatory saw blades having their backs in close contact and with their teeth arranged to cut a common kerf, a pair of cross heads for each saw, each pair being removably connected to its saw blade at opposite ends thereof on the outer face of its blade, two casings, each provided with a pair of guide-ways, one for the cross-head of one saw blade and the other for the cross-head of the other blade, said guide-ways being on opposite sides of the saw blades whereby the latter may move entirely across the casing with their backs in close contact with each other; two epicyclic gear trains in each casing, arranged opposite each other on opposite sides of the saw blades, each train comprising a fixed gear wheel carried by the casing, a rotatable sun-gear wheel mounted in the casing concentric with the fixed gear, a planet gear wheel, and a change gear wheel, each journaled separately on its sun-gear wheel and in mesh with each other and with its corresponding fixed gear wheel, the planet and change gear wheel on one sun wheel being displaced 180 degrees relative to the corresponding gears of the companion sun-wheel in the same casing, a crank fixed to each planet wheel and pivotally connected to the respective cross-head for its coacting blade, the pitch diameter of each planet wheel being one-half the pitch diameter of its fixed wheel, the radial distance between the axis of rotation of the planet wheel and the axis of the pivot connection of the crank and its cross-head being equal to the radial distance between the axis of the planet wheel and that of its fixed gear wheel, a common gear device for each casing, each comprising a shaft and two similar gear wheels fixed thereon, each of said gears meshing with its corresponding sun-wheel whereby the two epicyclic trains are maintained in unison, and a motor for each casing, carried by it and arranged to drive the corresponding common gear device.

9. In a portable sawing apparatus, in combination, two identical reciprocatory saw blades having their backs in close contact and with their teeth arranged to cut a common kerf, a pair of cross heads for each saw, one pair being removably connected to its saw blade at opposite ends thereof on the outer face of its blade, two casings, each provided with a pair of guide-ways, one for the cross-head of one saw blade and the other for the cross-head of the other blade, said guide-ways being on opposite sides of the saw blades whereby the latter may move entirely across the casing with their backs in close contact with each other; two epicyclic gear trains in each casing, arranged opposite each other on opposite sides of the saw blades, each train comprising a fixed gear wheel carried by the casing, a rotatable sun-gear wheel mounted in the casing concentric with the fixed gear, a planet gear wheel and a change gear wheel, each journaled separately on its sun-gear wheel and in mesh with each other and with its corresponding fixed gear wheel, the planet and change gear wheel on one sun wheel being displaced 180 degrees relative to the corresponding gears of the companion sun-wheel in the same casing, a crank fixed to each planet wheel and pivotally connected to the respective cross-head for its coacting blade, the pitch diameter of each planet wheel being one-half the pitch diameter of its fixed wheel, the radial distance between the axis of rotation of the planet wheel and the axis of the pivot connection of the crank and its crosshead being equal to the radial distance between the axis of the planet wheel and that of its fixed gear wheel, a common gear device for each casing, each comprising a shaft and two similar gear wheels fixed thereon, each of said gears meshing with its corresponding sun-wheel whereby the two epicyclic trains are maintained in unison, a motor for each casing, carried by it and arranged to drive the corresponding common gear device, and a yoke device connected to both casings and arranged to hold said casings apart to tension the saw blades.

10. In a portable sawing apparatus, in combination, two identical reciprocatory saw blades having their backs in close contact and with their teeth arranged to cut a common kerf, a pair of cross heads for each saw, each pair being removably connected to its saw blade at opposite ends thereof on the outer face of its blade, two casings, each provided with a pair of guide-ways, one for the cross heads of one saw-blade and the other for the cross head of the other blade, said guide-ways being on opposite sides of the saw blades whereby the latter may move entirely across the casing with their backs in close contact with each other; two epicyclic gear trains in each casing, arranged opposite each other on opposite sides of the saw blades, each train comprising a fixed gear wheel carried by the casing, a rotatable sun-gear wheel mounted in the casing concentric with the fixed gear, a planet gear wheel and a change gear wheel, each journaled separately on its sun-gear wheel and in mesh with each other and with its corresponding fixed gear wheel, the planet and change gear wheel on one sun wheel being displaced 180 degrees relative to the corresponding gears of the companion sun-wheel in the same casing, a crank fixed to each planet wheel and pivotally connected to the respective cross-head for its coacting blade, the pitch diameter of each planet wheel being one-half the pitch diameter of its fixed wheel, the radial distance between the axis of rotation of the planet wheel and the axis of the pivot connection of the crank and its crosshead being equal to the radial distance between the axis of the planet wheel and that of its fixed gear wheel, a common gear device for each casing, each comprising a shaft and two similar gear wheels fixed thereon, each of said gears meshing with its corresponding sun-wheel whereby the two epicyclic trains are maintained in unison, a compressed air motor for each casing, carried by it and arranged to drive the corresponding common gear device, each motor being arranged to discharge its exhaust air into its casing and in contact with the gearing therein.

EDWARD DE VOE TOMPKINS.